(12) United States Patent
Aruga et al.

(10) Patent No.: US 11,532,146 B2
(45) Date of Patent: Dec. 20, 2022

(54) INFORMATION PROCESSING SYSTEM, INFORMATION PROCESSING METHOD, AND INFORMATION PROCESSING APPARATUS FOR ASSISTING INPUT OF INFORMATION

(71) Applicants: Ryoh Aruga, Kanagawa (JP); Hiroshi Kobayashi, Kanagawa (JP); Fumihiro Teshima, Chiba (JP)

(72) Inventors: Ryoh Aruga, Kanagawa (JP); Hiroshi Kobayashi, Kanagawa (JP); Fumihiro Teshima, Chiba (JP)

(73) Assignee: Ricoh Company, Ltd., Tokyo (JP)

( * ) Notice: Subject to any disclaimer, the term of this patent is extended or adjusted under 35 U.S.C. 154(b) by 171 days.

(21) Appl. No.: 17/079,880

(22) Filed: Oct. 26, 2020

(65) Prior Publication Data
US 2021/0124973 A1 Apr. 29, 2021

(30) Foreign Application Priority Data
Oct. 29, 2019 (JP) .............................. JP2019-196152

(51) Int. Cl.
*G06K 9/00* (2022.01)
*G06V 10/40* (2022.01)
*G06V 30/412* (2022.01)
*G06V 30/416* (2022.01)
*G06V 30/10* (2022.01)

(52) U.S. Cl.
CPC ............ *G06V 10/40* (2022.01); *G06V 30/412* (2022.01); *G06V 30/416* (2022.01); *G06V 30/10* (2022.01)

(58) Field of Classification Search
CPC ............................. G06V 10/40; G06V 30/412
See application file for complete search history.

(56) References Cited

U.S. PATENT DOCUMENTS

| 9,753,908 | B2 * | 9/2017 | Gitlin | G06F 40/143 |
|---|---|---|---|---|
| 10,671,805 | B2 * | 6/2020 | Pennington | G06Q 10/10 |
| 2014/0241631 | A1 * | 8/2014 | Huang | G06V 30/414 |
| | | | | 382/176 |
| 2016/0155202 | A1 * | 6/2016 | Huang | G06Q 40/123 |
| | | | | 382/176 |
| 2016/0253303 | A1 * | 9/2016 | Pennington | G06V 30/40 |
| | | | | 715/226 |
| 2017/0243059 | A1 * | 8/2017 | Goyal | G06Q 50/12 |

(Continued)

FOREIGN PATENT DOCUMENTS

| JP | 2011238089 A | * 11/2011 |
|---|---|---|
| JP | 2015146075 A | * 8/2015 |

(Continued)

OTHER PUBLICATIONS

Extracting structured data from invoices, Xavier Holt et al., PALTAW, 2018, pp. 53-59 (Year: 2018).*

*Primary Examiner* — Jayesh A Patel
(74) *Attorney, Agent, or Firm* — IPUSA, PLLC

(57) ABSTRACT

An information processing system includes circuitry configured to accept a selection of specification information from a list of the specification information displayed on a display, the specification information being included in form information acquired by performing form recognition; and display, on the display, an input field in which journal information based on the selected specification information is input.

17 Claims, 17 Drawing Sheets

(56) References Cited

U.S. PATENT DOCUMENTS

| | | | |
|---|---|---|---|
| 2020/0026752 A1* | 1/2020 | Ishikura | G06V 30/412 |
| 2020/0026915 A1* | 1/2020 | Tojo | G06V 30/40 |
| 2020/0026950 A1* | 1/2020 | Kobayashi | G06V 30/412 |

FOREIGN PATENT DOCUMENTS

| | | | |
|---|---|---|---|
| JP | 2018-194971 | | 12/2018 |
| JP | 2018194971 A | * | 12/2018 |
| JP | 2020-021461 | | 2/2020 |

* cited by examiner

FIG.4
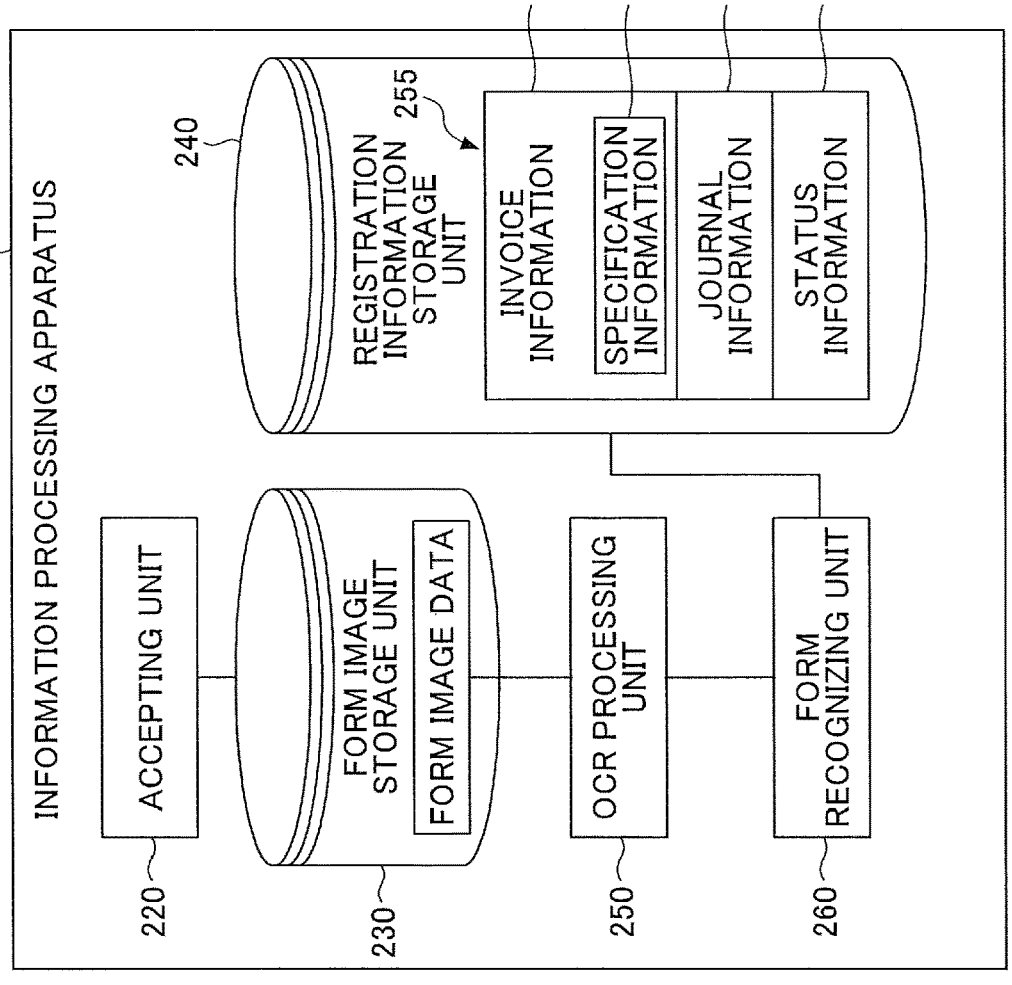
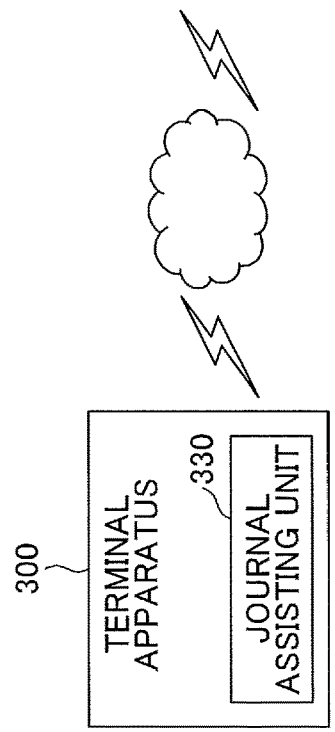

FIG.5A

< FORM CONFIRMATION/CORRECTION — 21

Page ◁ 1/1 ▷ ⤓     Zoom ⊕ ⊖ ▢

INVOICE

INVOICING DATE: JULY 20, 2018
OOXX FURNITURE CENTER CO., LTD.

TO OO INDUSTRIES CO., LTD.

PAYMENT METHOD: PLEASE TRANSFER TO FOLLOWING ACCOUNT.
PAYMENT DUE DATE: AUGUST 20, 2018

WE ARE INVOICING THE FOLLOWING AMOUNT.

CUSTOMER NUMBER   A1-4567-89
INVOICE No.   A123-03
CLOSING DATE   FOR JUNE 2018

TOTAL INVOICE AMOUNT   ¥1,790,208
CONSUMPTION TAX   ¥132,608

SHINJUKU BANK   BRANCH OFFICE: OOCHUO
TYPE: CURRENT   ACCOUNT NUMBER: 96...
NOMINAL PERSON: OOXX FURNITURE CENTER (F

— 21a

| ARTICLE CODE | ARTICLE NAME | NUMERICAL QUANTITY | UNIT PRICE | AMOUNT |
|---|---|---|---|---|
| 10845 | RECEPTION TABLE | 2 | ¥59,800 | ¥119,600 |
| 22563 | OFFICE WORK DESK | 14 | ¥14,800 | ¥207,200 |
| 00562 | CHAIR | 14 | ¥36,800 | ¥515,200 |
| 41523 | CABINET | 10 | ¥59,800 | ¥598,000 |
| 20783 | SHREDDER | 2 | ¥19,800 | ¥39,600 |
| 30856 | REFRIGERATOR | 2 | ¥89,000 | ¥178,000 |
| | | | SUB TOTAL | ¥1,657,600 |

244

— 22   [UNPROCESSED]

INVOICE SOURCE INFORMATION — 23

INVOICE NUMBER [A123-03]   INVOICING DATE [2018/07/20]
INVOICE SOURCE [OOXX CENTER]
INVOICE AMOUNT (TAX EXCLUDED) [1,657,600]   INVOICE AMOUNT (TAX INCLUDED) [ ] JOURNAL

SPECIFICATION INFORMATION   [JOURNAL CLEAR] — 24e

JOURNAL — ARTICLE NAME   TOTAL AMOUNT / AMOUNT

☐ RECEPTION TABLE   119,600
☐ OFFICE WORK DESK   207,200
☐ CHAIR   515,200

24d   24a   24c   24b   24f

TOTAL OF SPECIFICATION 1,790,208   [JOURNAL FROM SPECIFICATION]

JOURNAL FORM [BUSINESS PARTNER CODE]   [2018/07/20] — 24

CREDIT SIDE TOTAL AMOUNT [TAX INCLUDED ▾] [0]   DEBIT SIDE TOTAL AMOUNT [TAX INCLUDED ▾] [0]

[000] SUBJECT CODE   [111] CASH
[12345678]   [ ] COMPONENT CODE
[123]   [ ] AUXILIARY CODE

242 — 25

[📄 TEMPORARILY SAVE]   [📄 VALIDATE]

< FORM CONFIRMATION/CORRECTION 21

Page ◁ 1/1 ▷  Zoom ⊕ ⊖ ▣

INVOICE
INVOICING DATE: JULY 20, 2018
OOXX FURNITURE CENTER CO., LTD.
TO OO INDUSTRIES CO., LTD.
PAYMENT METHOD: PLEASE TRANSFER
TO FOLLOWING ACCOUNT.
PAYMENT DUE DATE: AUGUST 20, 2018

WE ARE INVOICING THE FOLLOWING AMOUNT.
CUSTOMER NUMBER   A1-4567-89
INVOICE No.       A123-03
CLOSING DATE      FOR JUNE 2018

TOTAL INVOICE AMOUNT   ¥1,790,208
CONSUMPTION TAX        ¥132,608

SHINJUKU BANK   BRANCH OFFICE: OOCHUO
TYPE: CURRENT   ACCOUNT NUMBER: 96-
NOMINAL PERSON: OOXX FURNITURE CENTER (F 21a  244

| ARTICLE CODE | ARTICLE NAME | NUMERICAL QUANTITY | UNIT PRICE | AMOUNT |
|---|---|---|---|---|
| 10845 | RECEPTION TABLE | 2 | ¥59,800 | ¥119,600 |
| 22563 | OFFICE WORK DESK | 14 | ¥14,800 | ¥207,200 |
| 00562 | CHAIR | 14 | ¥36,800 | ¥515,200 |
| 41523 | CABINET | 10 | ¥59,800 | ¥598,000 |
| 20783 | SHREDDER | 2 | ¥19,800 | ¥39,600 |
| 30856 | REFRIGERATOR | 2 | ¥89,000 | ¥178,000 |
| | | | SUB TOTAL | ¥1,657,600 |

20B

22 [UNPROCESSED]

INVOICE SOURCE INFORMATION — 23

INVOICE NUMBER  A123-03    INVOICING DATE  2018/07/20
INVOICE SOURCE  OOXX CENTER
INVOICE AMOUNT (TAX EXCLUDED)  1,657,600   INVOICE AMOUNT (TAX INCLUDED)  JOURNAL ☐

SPECIFICATION INFORMATION   [JOURNAL CLEAR] 24e — 24

JOURNAL  ARTICLE NAME                 AMOUNT  TOTAL AMOUNT
☑  RECEPTION TABLE                    119,600
☐  OFFICE WORK DESK                   207,200
☐  CHAIR                              515,200
24d    24a    24c    24b    24f

TOTAL OF SPECIFICATION 119,600   [JOURNAL FROM SPECIFICATION]

JOURNAL FORM [BUSINESS PARTNER CODE]  2018/07/20 — 25

CREDIT SIDE TOTAL AMOUNT 119,600   DEBIT SIDE TOTAL AMOUNT 119,600
[TAX INCLUDED ▼] 119,600  0    [TAX INCLUDED ▼] 119,600  0
SUBJECT CODE                          111 CASH
000                                   COMPONENT CODE
12345678                              AUXILIARY CODE
123
RECEPTION TABLE
242                25a                              25b

[🗑 TEMPORARILY SAVE]  26       [🗑 VALIDATE]  27

| ID | X COORDINATE | Y COORDINATE | CHARACTER WIDTH | CHARACTER HEIGHT | CERTAINTY FACTOR | CHARACTER |
|---|---|---|---|---|---|---|
| 73 | 363 | 552 | 47 | 45 | 99 | ARTICLE |
| 74 | 406 | 552 | 43 | 42 | 99 | NAME |
| 75 | 452 | 552 | 46 | 42 | 99 | |
| ... | | | ... | | | |
| 80 | 1018 | 549 | 28 | 27 | 99 | AMOUNT |
| 81 | 1040 | 551 | 22 | 28 | 99 | |
| ... | | | ... | | | |
| 98 | 385 | 606 | 77 | 37 | 98 | R |
| 99 | 958 | 606 | 14 | 37 | 98 | 1 |
| 100 | 972 | 613 | 15 | 23 | 99 | 1 |
| 101 | 987 | 614 | 15 | 20 | 99 | 9 |
| 102 | 1002 | 613 | 11 | 26 | 99 | , |
| 103 | 1013 | 615 | 15 | 27 | 99 | 6 |
| 104 | 1028 | 607 | 13 | 35 | 99 | 0 |
| 105 | 1042 | 609 | 14 | 32 | 99 | 0 |

FIG.6B

| ID | X COORDINATE | Y COORDINATE | KEYWORD WIDTH | KEYWORD HEIGHT | KEYWORD |
|---|---|---|---|---|---|
| 17 | 363 | 552 | 153 | 45 | ARTICLE NAME |
| 22 | 985 | 553 | 98 | 32 | AMOUNT |
| 36 | 358 | 606 | 350 | 37 | RECEPTION TABLE |
| 41 | 958 | 606 | 84 | 15 | 119,600 |

FIG.6C

| CELL ID | X COORDINATE | Y COORDINATE | CELL WIDTH | CELL HEIGHT |
|---|---|---|---|---|
| 2 | 355 | 532 | 221 | 82 |
| 7 | 955 | 532 | 380 | 82 |
| 9 | 355 | 619 | 221 | 80 |

FIG.7

| ARTICLE CODE | ARTICLE NAME | NUMERICAL QUANTITY | UNIT PRICE | AMOUNT | JOURNAL COMPLETION FLAG |
|---|---|---|---|---|---|
| 10845 | RECEPTION TABLE | 2 | ¥59,800 | ¥119,600 | False |
| 22563 | OFFICE WORK DESK | 14 | ¥14,800 | ¥207,200 | False |
| 00562 | CHAIR | 14 | ¥36,800 | ¥515,200 | False |
| 41523 | CABINET | 10 | ¥59,800 | ¥598,000 | False |
| 20783 | SHREDDER | 2 | ¥19,800 | ¥39,600 | False |
| 30856 | REFRIGERATOR | 2 | ¥89,000 | ¥178,000 | False |

| ID | NAME | TELEPHONE NUMBER | ACCOUNT NUMBER | JOURNAL INFORMATION 242 | | | | | | |
|---|---|---|---|---|---|---|---|---|---|---|
| | | | | JOURNAL ID | AMOUNT | SUBJECT CODE | DEPARTMENT CODE | AUXILIARY CODE | TAX INCLUDED/ TAX EXCLUDED | REMARKS FIELD |
| 1 | ○○XX FURNITURE CENTER CO., LTD | 03-○○○○-△△△△ | 96... | 1 | 119,600 | 0001 | 12345678 | 123 | TAX INCLUDED | RECEPTION TABLE |
| | | | | 2 | 722,400 | 0003 | 11111111 | 222 | TAX INCLUDED | OFFICE WORK DESK, CHAIR |
| | | | | ... | ... | ... | ... | ... | ... | ... |
| ... | | | | | | | | | | |

FIG.11

FORM CONFIRMATION/CORRECTION — 21

Page ◁ 1/1 ▷  Zoom ⊕ ⊖

INVOICE

INVOICING DATE: JULY 20, 2018
OOXX FURNITURE CENTER CO., LTD.

TO OO INDUSTRIES CO., LTD.

PAYMENT METHOD: PLEASE TRANSFER TO FOLLOWING ACCOUNT.
PAYMENT DUE DATE: AUGUST 20, 2018

WE ARE INVOICING THE FOLLOWING AMOUNT.

| CUSTOMER NUMBER | A1-4567-89 |
| INVOICE No. | A123-03 |
| CLOSING DATE | FOR JUNE 2018 |

| TOTAL INVOICE AMOUNT | ¥1,790,208 |
| CONSUMPTION TAX | ¥132,608 |

SHINJUKU BANK  BRANCH OFFICE: OOCHUO
TYPE: CURRENT  ACCOUNT NUMBER: 96-....
NOMINAL PERSON: OOXX FURNITURE CENTER (F

| ARTICLE CODE | ARTICLE NAME | NUMERICAL QUANTITY | UNIT PRICE | AMOUNT |
|---|---|---|---|---|
| 10845 | RECEPTION TABLE | 2 | ¥59,800 | ¥119,600 |
| 22563 | OFFICE WORK DESK | 14 | ¥14,800 | ¥207,200 |
| 00562 | CHAIR | 14 | ¥36,800 | ¥515,200 |
| 41523 | CABINET | 10 | ¥59,800 | ¥598,000 |
| 20783 | SHREDDER | 2 | ¥19,800 | ¥39,600 |
| 30856 | REFRIGERATOR | 2 | ¥89,000 | ¥178,000 |
| | | | SUB TOTAL | ¥1,657,600 |

— 244

---

[UNPROCESSED] — 22

INVOICE SOURCE INFORMATION — 23

| INVOICE NUMBER | A123-03 | INVOICING DATE | 2018/07/20 |
| INVOICE SOURCE | OOXX CENTER | | |
| INVOICE AMOUNT (TAX EXCLUDED) | 1,657,600 | INVOICE AMOUNT (TAX INCLUDED) | ☐ JOURNAL |

SPECIFICATION INFORMATION  [JOURNAL CLEAR]  TOTAL AMOUNT — 24e

| JOUR-NAL | ARTICLE NAME | AMOUNT |
|---|---|---|
| ☑ | RECEPTION TABLE | 119,600 |
| ☑ | OFFICE WORK DESK | 207,200 |
| ☑ | CHAIR | 515,200 |

24d  24a  24c  24b 24f

TOTAL OF SPECIFICATION 722,400  [JOURNAL FROM SPECIFICATION]

---

JOURNAL FORM [BUSINESS PARTNER CODE] 2018/07/20 — 24

CREDIT SIDE TOTAL AMOUNT 842,000   DEBIT SIDE TOTAL AMOUNT 842,000 — 242

| [TAX INCLUDED] 119,600 ◆ 0 | [TAX INCLUDED] 119,600 ◆ 0 |
| SUBJECT CODE 000 | SUBJECT CODE 000 | 111 CASH |
| 12345678 | COMPONENT CODE |
| 123 | AUXILIARY CODE |
| RECEPTION TABLE | |

— 25A

| [TAX INCLUDED] 722,400 ◆ 0 | [TAX INCLUDED] 722,400 ◆ 0 |
| SUBJECT CODE 000 | 111 CASH |
| | COMPONENT CODE |
| | AUXILIARY CODE |
| OFFICE WORK DESK·CHAIR | |

— 25B 25c  25d

[▤ TEMPORARILY SAVE] — 26   [▤ VALIDATE] — 27

< FORM CONFIRMATION/CORRECTION  21

Page ◁ 1/1 ▷  Zoom ⊕ ⊖ ▢

INVOICE  INVOICING DATE: JULY 20, 2018
OOXX FURNITURE CENTER CO., LTD.

TO OO INDUSTRIES CO., LTD.
PAYMENT METHOD: PLEASE TRANSFER
TO FOLLOWING ACCOUNT.
PAYMENT DUE DATE: AUGUST 20, 2018

WE ARE INVOICING THE FOLLOWING AMOUNT.

| CUSTOMER NUMBER | A1-4567-89 |
| INVOICE No. | A123-03 |
| CLOSING DATE | FOR JUNE 2018 |

| TOTAL INVOICE AMOUNT | ¥1,481,600 |
| CONSUMPTION TAX | ¥ *** |

SHINJUKU BANK  BRANCH OFFICE: OOCHUO
TYPE: CURRENT  ACCOUNT NUMBER: 96-...
NOMINAL PERSON: OOXX FURNITURE CENTER (F

| ARTICLE CODE | ARTICLE NAME | NUMERICAL QUANTITY | UNIT PRICE | CATE-GORY | AMOUNT |
|---|---|---|---|---|---|
| 10845 | RECEPTION TABLE | 2 | ¥59,800 | | ¥119,600 |
| 22563 | OFFICE WORK DESK | 14 | ¥14,800 | | ¥207,200 |
| 00562 | CHAIR | 14 | ¥36,800 | | ¥515,200 |
| 41523 | CABINET | 10 | ¥59,800 | | ¥598,000 |
| 20783 | SHREDDER | 2 | ¥19,800 | | ¥39,600 |
| 30856 | FOOD | 2 | ¥1,000 | * | ¥2,000 |
| | | | SUB TOTAL | | ¥1,481,600 |

UNPROCESSED

INVOICE SOURCE INFORMATION

| INVOICE NUMBER | A123-03 | INVOICING DATE | 2018/07/20 |
| INVOICE SOURCE | OOXX CENTER | | |
| INVOICE AMOUNT (TAX EXCLUDED) | 1,657,600 | INVOICE AMOUNT (TAX INCLUDED) | JOURNAL |

JOURNAL CLEAR  TOTAL AMOUNT ¥XXXXX

SPECIFICATION INFORMATION 1 (TAX RATE 10%)

| JOUR-NAL | ARTICLE NAME | | AMOUNT |
| ☑ | RECEPTION TABLE | | 119,600 |
| ☑ | OFFICE WORK DESK | | 207,200 |
| ☐ | ......... | | |

JOURNAL FROM SPECIFICATION

TOTAL OF SPECIFICATION ¥XXXXX

SPECIFICATION INFORMATION 2 (TAX RATE 8%)

| JOUR-NAL | ARTICLE NAME | | AMOUNT |
| ☑ | FOOD | | 2,000 |

TOTAL OF SPECIFICATION ¥2,000

JOURNAL FROM SPECIFICATION

| JOURNAL FORM | BUSINESS PARTNER CODE | | 2018/07/20 |
| CREDIT SIDE TOTAL AMOUNT 326,800 TAX INCLUDED ≑ 0 | 326,800 | DEBIT SIDE TOTAL AMOUNT 326,800 TAX INCLUDED 0 | 326,800 |
| 000 SUBJECT CODE | | 111 CASH | |
| 12345678 | | COMPONENT CODE | |
| 123 | | AUXILIARY CODE | |
| RECEPTION TABLE, OFFICE WORK DESK | | | |

TEMPORARILY SAVE    VALIDATE

△

INFORMATION PROCESSING SYSTEM, INFORMATION PROCESSING METHOD, AND INFORMATION PROCESSING APPARATUS FOR ASSISTING INPUT OF INFORMATION

CROSS-REFERENCE TO RELATED APPLICATION

The present application is based on and claims priority under 35 U.S.C. § 119 to Japanese Patent Application No. 2019-196152, filed on Oct. 29, 2019, the contents of which are incorporated herein by reference in their entirety.

BACKGROUND OF THE INVENTION

1. Field of the Invention

The present invention relates to an information processing system and a method.

2. Description of the Related Art

Conventionally, there has been a known technique of associating information acquired by character recognition from image data of a form, with manually input information, and providing these associated pieces of information to an accounting system and the like. The manually input information includes, for example, journal information indicating the contents of journals and the like.

Patent Document 1: Japanese Unexamined Patent Application Publication No. 2018-194971

SUMMARY OF THE INVENTION

According to one aspect of the present invention, there is provided an information processing system including circuitry configured to accept a selection of specification information from a list of the specification information displayed on a display, the specification information being included in form information acquired by performing form recognition; and display, on the display, an input field in which journal information based on the selected specification information is input.

BRIEF DESCRIPTION OF THE DRAWINGS

FIG. 4 is a diagram illustrating a functional configuration of each apparatus included in the information processing system according to the first embodiment of the present invention;

FIG. 5A is a first diagram for describing an outline of an operation of the information processing system according to the first embodiment of the present invention;

FIG. 5B is a second diagram for describing an outline of an operation of the information processing system according to the first embodiment of the present invention;

FIGS. 6A to 6C are diagrams for describing a form recognizing unit according to the first embodiment of the present invention;

FIG. 7 is a diagram illustrating an example of specification information according to the first embodiment of the present invention;

FIG. 8 is a diagram illustrating an example of journal information according to the first embodiment of the present invention;

FIG. 11 is a diagram illustrating a display example according to the first embodiment of the present invention;

FIG. 14 is a diagram illustrating a display example according to the second embodiment of the present invention.

DETAILED DESCRIPTION OF THE PREFERRED EMBODIMENTS

In the conventional technology, the journal information is manually input while confirming the contents of specifications by referring to an image of a form, etc., which places a heavy load on the user who inputs the information.

A problem to be addressed by an embodiment of the present invention is to reduce the load of inputting journal information.

First Embodiment

Figure 1:
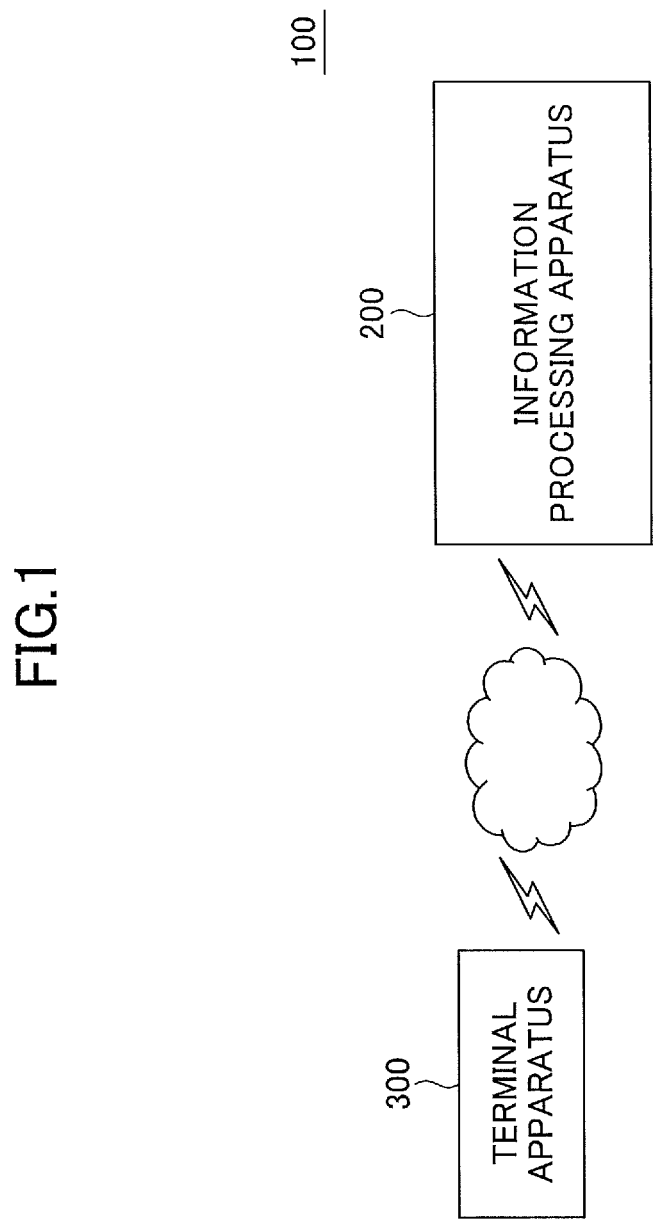
FIG. 1 is a diagram illustrating an example of a system configuration of an information processing system according to a first embodiment of the present invention.

Hereinafter, embodiments will be described with reference to the drawings. FIG. 1 is a diagram illustrating an example of a system configuration of an information processing system according to a first embodiment.

An information processing system 100 according to the present embodiment includes an information processing apparatus 200 and a terminal apparatus 300. The information processing apparatus 200 and the terminal apparatus 300 are connected via a network and the like. In the example of FIG. 1, the number of the terminal apparatuses 300 included in the information processing system 100 is one, but the present embodiment is not limited thereto. Any number of the terminal apparatuses 300 may be included in the information processing system 100.

In the example of FIG. 1, the number of the information processing apparatuses 200 included in the information processing system 100 is one, but the present embodiment is not limited thereto. The functions of the information processing apparatus 200 according to the present embodiment may be implemented by a plurality of information processing apparatuses.

The information processing apparatus 200 according to the present embodiment stores form image data obtained by reading a form, for example, by a scanner, and performs various processes using the form image data.

At the terminal apparatus 300 according to the present embodiment, the result of processes by the information processing apparatus 200 is displayed, information is input to the information processing apparatus 200, and the like.

Hereinafter, the hardware configuration of each apparatus of the information processing system 100 will be described with reference to FIGS. 2 and 3.

Figure 2:
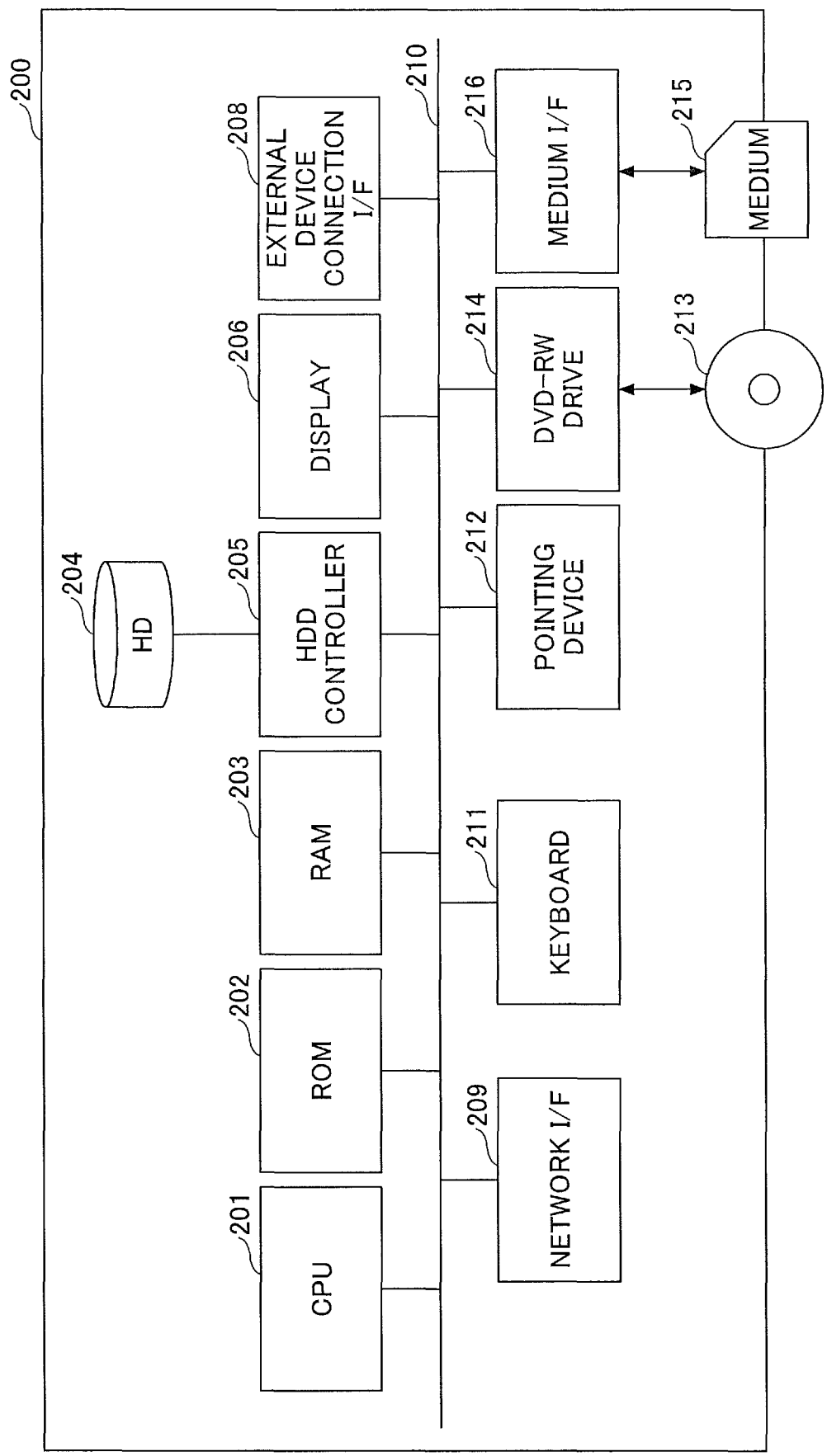
FIG. 2 is a diagram illustrating an example of a hardware configuration of an information processing apparatus according to the first embodiment of the present invention.

FIG. 2 is a diagram illustrating an example of a hardware configuration of the information processing apparatus.

Figure 3:
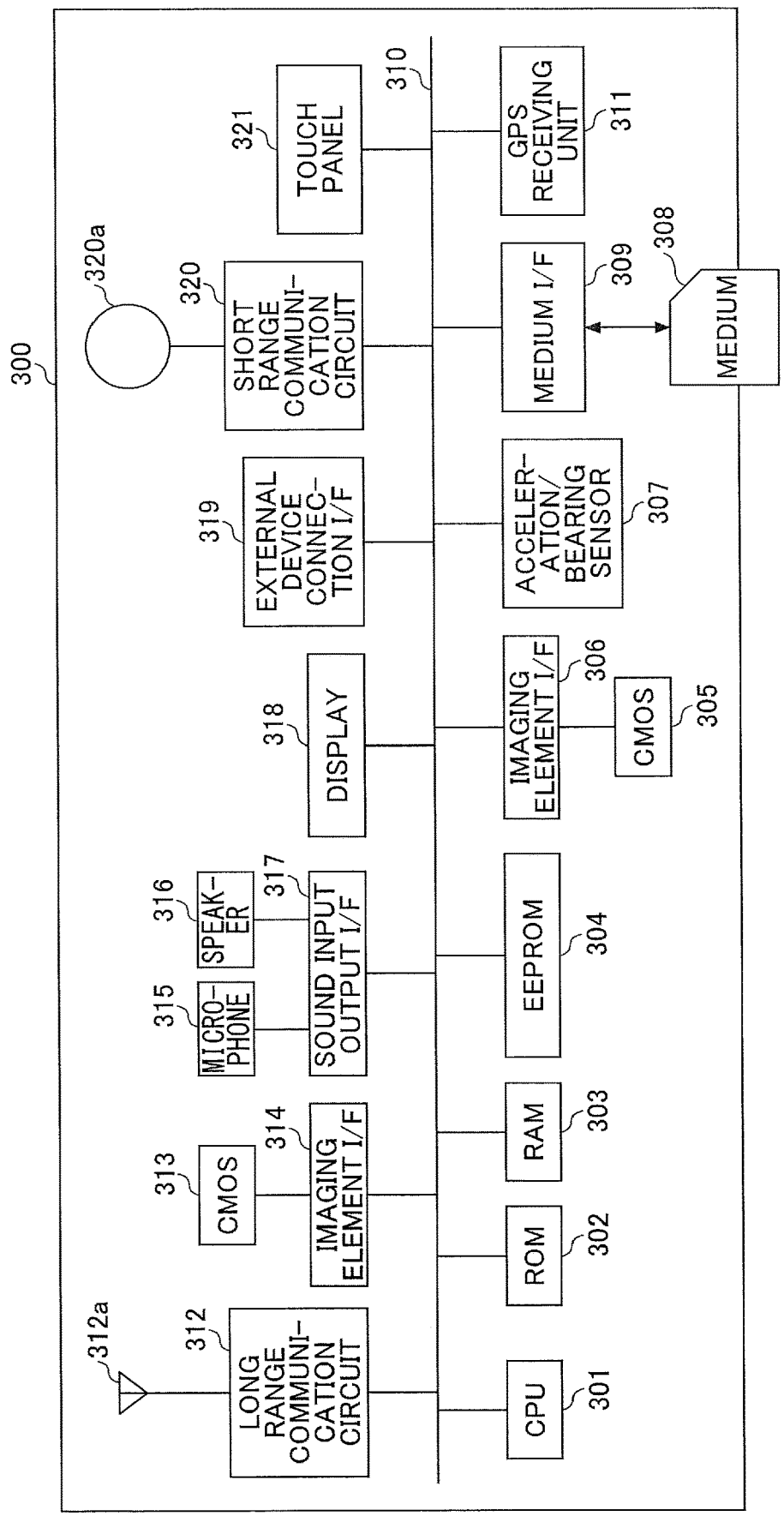
FIG. 3 is a diagram illustrating an example of a hardware configuration of a terminal apparatus according to the first embodiment of the present invention.

The information processing apparatus 200 according to the present embodiment is constructed by a computer and includes a central processing unit (CPU) 201, a read-only memory (ROM) 202, a random access memory (RAM) 203, a hard disk (HD) 204, a hard disk drive (HDD) controller 205, a display 206, an external device connection interface (I/F) 208, a network I/F 209, a data bus 210, a keyboard 211, a pointing device 212, a Digital Versatile Disk Rewritable (DVD-RW) drive 214, and a medium I/F 216, as illustrated in FIG. 3.

Among these, the CPU 201 controls the operations of the entire information processing apparatus 200. The ROM 202 stores a program used to drive the CPU 201, such as an initial program loader (IPL). The RAM 203 is used as a work area of the CPU 201. The HD 204 stores various kinds of data such as programs. The HDD controller 205 controls the reading or writing of various kinds of data to the HD 204 according to the control of the CPU 201. The display 206 is a display unit for displaying various kinds of information such as a cursor, a menu, windows, characters, images, and the like.

The external device connection I/F 208 is an interface for connecting various external devices. In this case, the external device may be, for example, a Universal Serial Bus (USB) memory or a printer. The network I/F 209 is an interface for performing data communication using a communication network N. The data bus 210 is an address bus, a data bus, and the like for electrically connecting elements such as the CPU 201 illustrated in FIG. 2.

The keyboard 211 is a type of input means having a plurality of keys for inputting characters, numbers, various indications, and the like. The pointing device 212 is a type of input means for selecting and executing various instructions, selecting a processing target, moving a cursor, and the like. The DVD-RW drive 214 controls the reading or writing of various kinds of data to a DVD-RW 213 that is an example of a removable recording medium. The recording medium may not only be a DVD-RW but may also be a Digital Versatile Disc Recordable (DVD-R), etc. The medium I/F 216 controls the reading or writing (storage) of data to a recording medium 215, such as a flash memory.

The information processing apparatus 200 according to the present embodiment may be, for example, a smartphone, a tablet terminal, a personal digital assistant (PDA), a wearable personal computer (PC), and the like.

FIG. 3 is a diagram illustrating an example of a hardware configuration of the terminal apparatus. The terminal apparatus 300 according to the present embodiment may be, for example, a smartphone or a tablet terminal.

The terminal apparatus 300 according to the present embodiment includes a CPU 301, a ROM 302, a RAM 303, an electrically erasable programmable read-only memory (EEPROM) 304, a Complementary Metal-Oxide-Semiconductor (CMOS) sensor 305, an imaging element I/F 306, an acceleration/bearing sensor 307, a medium I/F 309, and a global positioning system (GPS) receiving unit 311.

Among these, the CPU 301 controls the operations of the entire terminal apparatus 300. The ROM 302 stores the CPU 301 and a program used for driving the CPU 301, such as the IPL. The RAM 303 is used as the work area of the CPU 301. The EEPROM 304 reads out or writes various kinds of data such as a program for the terminal apparatus according to the control of the CPU 301. The CMOS sensor 305 is a type of built-in imaging means that captures a subject (mainly a self-image) and obtains image data according to the control of the CPU 301. The imaging means may be a Charge Coupled Device (CCD) sensor, instead of a CMOS sensor. The imaging element I/F 306 is a circuit that controls the driving of the CMOS sensor 305. The acceleration/bearing sensor 307 includes a variety of sensors such as an electromagnetic compass, a gyrocompass, and an acceleration sensor for detecting a geomagnetic field. The medium I/F 309 controls the reading or writing (storage) of data to a recording medium 308, such as a flash memory. The GPS receiving unit 311 receives a GPS signal from a GPS satellite.

The terminal apparatus 300 further includes a long range communication circuit 312, a CMOS sensor 313, an imaging element I/F 314, a microphone 315, a speaker 316, a sound input output I/F 317, a display 318, an external device connection I/F 319, a short range communication circuit 320, an antenna 320a of the short range communication circuit 320, and a touch panel 321.

Among these, the long range communication circuit 312 is a circuit that communicates with other devices via a communication network. The CMOS sensor 313 is a type of built-in imaging means that captures a subject and obtains image data according to the control of the CPU 301. The imaging element I/F 314 is a circuit that controls the driving of the CMOS sensor 313. The microphone 315 is a built-in circuit that converts sound to an electrical signal.

The speaker 316 is a built-in circuit that converts electrical signals to physical vibrations to produce sound, such as music and voice sound. The sound input output I/F 317 is a circuit that processes the input and output of sound signals between the microphone 315 and the speaker 316 according to the control of the CPU 301. The display 318 is a type of display means such as a liquid crystal display or an organic Electro Luminescence (EL) display for displaying an image of a subject or various icons.

The external device connection I/F 319 is an interface for connecting various external devices. The short range communication circuit 320 is a communication circuit such as Near Field Communication (NFC) or Bluetooth (registered trademark). The touch panel 321 is a type of input means for operating the terminal apparatus 300 by a user pressing the display 318.

The terminal apparatus 300 includes a bus line 310. The bus line 310 is an address bus, a data bus, and the like for electrically connecting elements such as the CPU 301 illustrated in FIG. 3.

Next, the functional configuration of each apparatus included in the information processing system 100 according to the present embodiment will be described with reference to FIG. 4. FIG. 4 is a diagram illustrating a functional configuration of each apparatus included in the information processing system according to the first embodiment.

The information processing apparatus 200 according to the present embodiment includes an accepting unit 220, a form image storage unit 230, a registration information storage unit 240, an Optical Character Recognition (OCR) processing unit 250, and a form recognizing unit 260.

The accepting unit 220, the OCR processing unit 250, and the form recognizing unit 260 according to the present embodiment are implemented by reading out a program stored in the ROM 202 and the like and executing the program by the CPU 201. The form image storage unit 230 and the registration information storage unit 240 according to the present embodiment are implemented, for example, by the HD 204 and the like.

For example, the accepting unit 220 accepts input of form image data from an image forming apparatus and the like that has read a form by a scanner and the like and acquires the form image data. Specifically, the information processing apparatus 200 may communicate with an image forming apparatus and the like having a scanner function, accept the form image data received from the image forming apparatus by the accepting unit 220, and store the accepted form image data in the form image storage unit 230. Further, the information processing apparatus 200 may acquire form image data by other methods and store the form image data in the form image storage unit 230.

The form image storage unit 230 stores image data representing an image of a form such as an invoice, for example. In the following description, an image of a form may be referred to as a form image, and image data representing an image of a form may be referred to as form image data.

The registration information storage unit 240 stores registration information 255. The registration information 255 includes invoice information 241, journal information 242, and status information 243. In the present embodiment, the invoice information 241, the journal information 242, and the status information 243 are associated with each other for each invoice source.

The invoice information 241 according to the present embodiment includes various kinds of information described in the form (invoice).

More specifically, the invoice information 241 is generated by acquiring text data from the form image data by a character recognition process by the OCR processing unit 250, extracting an item and a value of the item included in the form image from the text data and associating the item with the value of the item by the form recognizing unit 260. An item included in the form image includes, for example, the invoice source, the invoice date, the article name, the unit price, the monetary amount (hereinafter, "amount"), etc.

Accordingly, the invoice information 241 according to the present embodiment includes specification information 244 indicating a breakdown of the invoice amount and the like in addition to the information concerning the invoice source indicated in the form image data. That is, the specification information 244 according to the present embodiment is the information included in the invoice information 241 and indicates the breakdown (specification) of the transaction.

In the following description, the extracting of an item and the value of the item included in a form image, the converting of the item and the value of the item into text data, and the associating of the item with the value, are referred to as form recognition. That is, the invoice information 241 is information acquired from the form image data by form recognition.

In the present embodiment, an invoice is described as an example of a form, and the invoice information 241 is described as an example of the form information that is acquired from form image data by form recognition. However, the form is not limited to an invoice. The form according to the present embodiment may be any form in which input of journal information based on specification information is required. Specifically, for example, the form according to the present embodiment may be a delivery slip or a receipt. In this case, the form information is delivery slip information and receipt information.

The journal information 242 is information input from the terminal apparatus 300 by a user and the like of the information processing system 100.

The status information 243 is information representing the state of the registration information 255 and is generated by the form recognizing unit 260 in accordance with the input state of various kinds of information corresponding to the invoice information 241. There are a plurality of states of the registration information 255 indicated by the status information 243. Specifically, for example, there are the following four states of the registration information 255 indicated by the status information 243.

Unprocessed state (state 1): A state immediately after the invoice information 241 is acquired by form recognition, and the journal information 242 is not input.

Draft saved state (state 2): A state in which tasks such as confirming the invoice information 241 and inputting the journal information 242 are being performed, and before the registration information 255 is validated.

Validated state (state 3): A state in which tasks such as confirming the invoice information 241 and inputting the journal information 242 have been completed, and the input information is output to the outside as validated information.

External output completed state (state 4): A state in which the output of the registration information 255 to an accounting system and the like cooperating with the information processing system 100, has been completed.

The status information 243 according to the present embodiment is information indicating which state the registration information 255 is in, among the above-described states 1 to 4.

In the example of FIG. 4, the form image storage unit 230 and the registration information storage unit 240 are configured to be included in the information processing apparatus 200, but are not limited thereto. The form image storage unit 230 and the registration information storage unit 240 may be partially or entirely disposed in an apparatus other than the information processing apparatus 200 that is capable of communicating with the information processing apparatus 200.

The OCR processing unit 250 according to the present embodiment performs a character recognition process on the form image data read out from the form image storage unit 230. In FIG. 4, although the function of the OCR processing unit 250 is included in the information processing apparatus 200, the OCR processing unit 250 is not limited thereto. For example, an OCR process on the form image data may be performed by an apparatus other than the information processing apparatus 200.

The form recognizing unit 260 performs form recognition by extracting an item and a value of the item included in the form image, from the text data acquired by the OCR processing unit 250, and associating the item and the value of the item with each other. In the present embodiment, the OCR processing unit 250 is provided separately from the form recognizing unit 260, but is not limited thereto. In the information processing apparatus 200, the form recognition may be performed by a single functional unit including both the OCR processing unit 250 and the form recognizing unit 260. In this case, the OCR processing unit 250 may be included in the form recognizing unit 260.

The form recognizing unit 260 registers (stores) the journal information 242 in the registration information storage unit 240 and outputs the registration information 255, etc. Details of the specification information 244 extracted by the form recognizing unit 260 and the registered journal information 242 will be described later.

The terminal apparatus 300 according to the present embodiment is connected to a mission-critical system that cooperates with the information processing system 100 according to the present embodiment, for example, via a network. The mission-critical system is, for example, a system that performs a particular process with respect to the registration information 255 to be output from the information processing system 100. Specifically, for example, the mission-critical system is a system that handles invoices such as an accounting system.

The terminal apparatus 300 according to the present embodiment acquires the registration information 255 from the information processing apparatus 200 and displays an input screen for inputting journal information corresponding to the invoice information 241 by using the specification information 244 included in the invoice information 241, thereby reducing the input load.

Specifically, the terminal apparatus 300 includes a journal assisting unit 330. When the registration information 255 is acquired from the information processing apparatus 200, the journal assisting unit 330 according to the present embodiment displays a list of the specification information 244 included in the registration information 255. When the journal assisting unit 330 accepts a selection of the specification information 244 and accepts an instruction to create the journal information 242 corresponding to the selected specification information 244, the journal assisting unit 330 displays an input field for inputting the journal information 242 for each piece of the selected specification information 244. Details of the journal assisting unit 330 are described below.

At this time, the terminal apparatus 300 according to the present embodiment generates a part of the journal information 242 for each piece of the selected specification information 244 and displays the part of the journal information 242 in the input field of the journal information 242.

Therefore, according to the present embodiment, when preparing a plurality of pieces of the journal information 242 from the invoice information 241 acquired from one piece of form image data, the specification information 244 to be journalized may be selected and an instruction for creating the journal information 242 may be given.

Further, when a part of the journal information 242 is created, the terminal apparatus 300 according to the present embodiment displays an input field for inputting the journal information 242 in a state where the created part of the created journal information 242 is input.

Therefore, the terminal apparatus 300 according to the present embodiment can support the task of inputting of the journal information 242 and reduce the load of inputting the journal information 242.

Hereinafter, an outline of the operation of the information processing system 100 according to the present embodiment will be described with reference to FIGS. 5A and 5B. FIG. 5A is a first diagram illustrating an outline of the operation of the information processing system, and FIG. 5B is a second diagram illustrating an outline of the operation of the information processing system.

A screen 20A illustrated in FIG. 5A is an example of a screen displayed on the display unit of the terminal apparatus 300, and the registration information 255 is displayed.

The screen 20A includes display fields 21, 22, 23, and 24, an input field 25, and operation buttons 26 and 27.

A form image indicated by form image data is displayed in the display field 21.

The status information 243 indicating the status of the registration information 255 is displayed in the display field 22. In the example of FIG. 5A, in the display field 22, "unprocessed" is displayed, and it is understood that the registration information 255 displayed in the screen 20A is in the unprocessed state (state 1).

In the display fields 23 and 24, the invoice information 241 acquired from the form image displayed in the display field 21, is displayed. More specifically, in the display field 23, the information about the invoice source and the invoice amount, etc., included in the invoice information 241 is displayed, and in the display field 24, the specification information 244 included in the invoice information 241 is displayed.

Hereinafter, the specification information 244 according to the present embodiment will be described.

In the example of FIG. 5A, a table 21a illustrating the transaction breakdown is displayed in the form image indicated in the display field 21. The specification information 244 according to the present embodiment is mainly information extracted from the table 21a included in the form image, and is information in which each item described in the table 21a and the value of the item described on the same line as the corresponding item are associated with each other.

Specifically, for example, in the table 21a, the items "article code", "article name", "numerical quantity", "unit price", and "amount" are listed, and a value of each of the items, i.e., "10845", "reception table", "2", "59,800 yen", and "119,600 yen", is listed on the same line as the corresponding item. Accordingly, the value "10845" of the item "article code", the value "reception table" of the item "article name", the value "2" of the item "numerical quantity", the value "59,800 yen" of the item "unit price", and the value "119,600 yen" of the item "amount" form one piece of the specification information 244.

As described above, in the present embodiment, the specification information 244 extracted from the form image data is information corresponding to each line in the table included in the form image. Accordingly, the invoice information 241 may include a plurality of pieces of the specification information 244.

Further the display field 24 includes display fields 24a, 24b, and 24c, a selection field 24d, and operation buttons 24e and 24f.

The display field 24a displays a list of articles of the item "article name" included in the specification information 244. The display field 24b displays a list of the values of the item "amount" associated with the respective articles of the item "article name" in the specification information 244. The display field 24c displays the total amount included in the specification information 244. That is, the display fields 24a, 24b, and 24c display a list of a part of the specification information 244.

The selection field 24d includes check boxes for selecting each of the article names listed in the display field 24a. That is, the selection field 24d includes check boxes for selecting the specification information 244.

The operation button 24e is for instructing to erase the journal information 242 of the past displayed in the input field 25. The operation button 24f is for instructing to create the journal information 242 using the specification information including the article name that has been selected by using the selection field 24d.

In the example of FIG. 5A, the article name is not selected in the selection field 24d and the total invoice amount included in the invoice information 241 is displayed in the display field 24c.

The input field 25 includes a plurality of input fields for inputting values, etc., of the respective items included in the journal information 242. In the example of FIG. 5A, the state indicated in the display field 22 is "unprocessed" and the journal information 242 is not input. Accordingly, the input fields included in the input field 25 are blank.

The operation button 26 is for changing the state of the registration information 255 displayed on the screen 20A to the draft saved state. According to the present embodiment, when the operation button 26 is operated, the state, indicated by the status information 243, of the registration information 255 displayed in the screen 20A, is changed from the unprocessed state to the draft saved state.

The operation button 27 is for changing the state of the registration information 255 displayed on the screen 20A to the validated state. In the present embodiment, when the operation button 27 is operated, the state, indicated by the status information 243, of the registration information 255 displayed on the screen 20A, is changed from the unprocessed state or the draft saved state to the validated state.

A screen 20B illustrated in FIG. 5B is an example of a screen displayed on a display unit of the terminal apparatus 300, and indicates a case in which an article has been selected from a list of article names displayed in the display field 24a of the screen 20A illustrated in FIG. 5A, and the operation button 24f has been operated.

In the screen 20B, in the selection field 24d, a check mark is input to the check box corresponding to the article name "reception table", and the specification information 244 including the article name "reception table" is selected. In the screen 20B, in the display field 24c, the amount corresponding to the article name "reception table" displayed in the display field 24b, is displayed.

Further, in the screen 20B, the input field 25 is displayed in a state where the amount displayed in the display field 24c is input in an input field 25a of the credit side total amount and an input field 25b of the debit side total amount.

That is, in the present embodiment, when the specification information 244 is selected in the display field 24, the input field 25 of the journal information 242 is displayed in a state where a part of the journal information 242, created using the selected specification information 244, is input.

In the present embodiment, the article name and the like included in the selected specification information 244 may be automatically displayed in the input field 25 as a part of the journal information 242. In the example of FIG. 5B, the article name of the selected specification information 244 is "reception table". Accordingly, the input field 25 of the journal information 242 is displayed in a state where "reception table" is input as the content of the remarks field.

As described above, according to the present embodiment, the specification information 244 can be used to support the inputting the journal information 242, thereby reducing the load of inputting the journal information 242.

Note that in the example of FIG. 5B, values are only input in the input fields 25a and 25b among the input fields in the input field 25, but the present embodiment is not limited thereto. The other input fields included in the input field 25 may be displayed in a state where the values are input, provided that the values can be acquired from the specification information 244. That is, a part of the journal information 242 may be information included in the selected specification information 244.

In the present embodiment, when an article name is selected from the display field 24a and the operation button 24f is operated, and thereafter, another article name is selected from the display field 24a again, and the operation button 24f is operated again, a new input field for inputting the journal information 242 is added to the input field 25.

Accordingly, according to the present embodiment, the specification information 244 included in the invoice information 241 can be used to support the creation of a plurality of pieces of the journal information 242 corresponding to the invoice information 241. Details of the addition of the journal information 242 are described below.

Note that in the present embodiment, it is assumed that the input field 25 is displayed in a state where a part of the journal information 242 is input, but the present embodiment is not limited thereto.

For example, according to the present embodiment, when the operation button 27 is operated and the journal information and the like is validated (to switch to the validated state), the specification information used for creating the journal information and the item values of the respective items included in the journal information may be stored in association with each other, for each piece of journal information. By associating the journal information and the specification information with each other, for example, when the operation button 24f is operated at the time of inputting journal information of another form, the value of each item of journal information corresponding to the selected specification information can be automatically input in the input field 25.

As a method of associating the journal information with the specification information, for example, the journal information may include the article name included in the specification information used for creating the journal information.

As described above, by associating the specification information with the journal information, when the specification information is selected, the values of items (the value of the subject code, etc.) included in the journal information corresponding to the article name or the article code can be identified and automatically input to the input field (the "subject code" field) corresponding to the screen.

Further, when a plurality of specifications are selected, the combinations of the selected plurality of article names and article codes may be stored in association with journal information, so that when a plurality of pieces of specification information are selected, the journal information corresponding to the combinations of article names and article codes can be identified.

The information stored in association with each other may be stored for each invoice source. Further, the information stored in association with each other may be updated whenever the journal information is validated, by using machine learning, etc.

In this way, it is possible to display the input field of the journal information in a state where all journal information is input in advance based on the specification information.

Next, a process of the form recognizing unit 260 in the information processing apparatus 200 will be described with reference to FIGS. 6A to 7.

FIGS. 6A to 6C are diagrams for describing the form recognizing unit. Reading result information 101 illustrated in FIG. 6A is the result of performing an OCR process by the OCR processing unit 250.

The reading result information 101 is extracted from the result obtained by cutting out the character field from the form image data (see FIG. 5A) displayed in the display field 21 of the screen 20A and recognizing the characters in the character field, and the coordinates indicating the positions of the characters.

The form recognizing unit 260 according to the present embodiment recognizes a character string by connecting characters at adjacent positions with each other, from the reading result information 101. Specifically, the form recognizing unit 260 may recognize a combination of characters in which the distance between the characters is within a predetermined pixel, as a single word.

Information 102 illustrated in FIG. 6B is information representing a character string recognized by the form recognizing unit 260 and a region of the character string.

The form recognizing unit 260 recognizes a region compartmentalized by vertical lines and horizontal lines as a single cell from the form image data and applies identification information (a cell ID) for identifying a cell, to each cell.

According to the present embodiment, the specification information is indicated in a table format. Therefore, the form recognizing unit 260 extracts a character string recognized in the region of the cell as a character string included in the specification information 244.

Information 103 illustrated in FIG. 6C indicates the association between the region of each cell recognized from the form image data displayed in the display field 21 of the screen 20A, and the cell ID.

In FIGS. 6A to 6C, for example, in the information 102, the region in which the character string "article name" is recognized, is identified from the height and width, with reference to the position indicated by the X and Y coordinates.

Further, in the information 103, it is also understood that the region in which the character string "article name" is recognized, is included in the cell ID "2". Accordingly, the character string "article name" is associated with the cell ID "2", as a character string included in the specification information 244.

In this manner, the form recognizing unit 260 according to the present embodiment extracts the specification information 244 in which a character string and a cell are associated with each other, from the form image data.

FIG. 7 is a diagram illustrating an example of the specification information. In the example of FIG. 7, the specification information 244 is indicated as information in a table format, but is not limited thereto.

The specification information 244 may be information corresponding to each line in a table included in a form image. That is, the specification information 244 may include, for example, information in which a cell ID and a character string in a region identified by the cell ID are associated with each other.

Further, as illustrated in FIG. 7, in the specification information 244, information indicating whether journalizing has been performed, may be added to the information corresponding to each line in the table.

In the present embodiment, by including information indicating whether the journalizing has been completed in the specification information 244, for example, it is possible to extract the specification information 244 that can be used, when using the specification information 244 that has been journalized.

The method of extracting the above-described specification information 244 is one example and is not limited thereto.

Next, the journal information 242 according to the present embodiment will be described with reference to FIG. 8. FIG. 8 is a diagram illustrating an example of journal information.

The journal information 242 according to the present embodiment is stored in association with information concerning the invoice source included in the invoice information 241. Specifically, information concerning the invoice source includes, for example, identification information (ID) to identify the invoice source, the name of the invoice source, the telephone number, the account number, etc. Further, the information concerning the invoice source may suffice provided that any one of an ID, the name of the invoice source, the phone number, and the account number is included.

The journal information 242 includes an item to be input to the input field 25 and the value of the item. Specifically, for example, the journal information 242 includes a journal ID, an amount, a subject code, a department code, an auxiliary code, a remarks field, and the like as items of the information. The journal ID is identification information used to identify the journal information 242.

The journal information 242 according to the present embodiment may include information for identifying the journalized article. Specifically, for example, it is assumed that the reception table is journalized in the journal information 242 having the journal ID "1". In this case, the journal information 242 of the journal ID "1" may include an article name, an article code, etc., for identifying the reception table.

Figure 9:
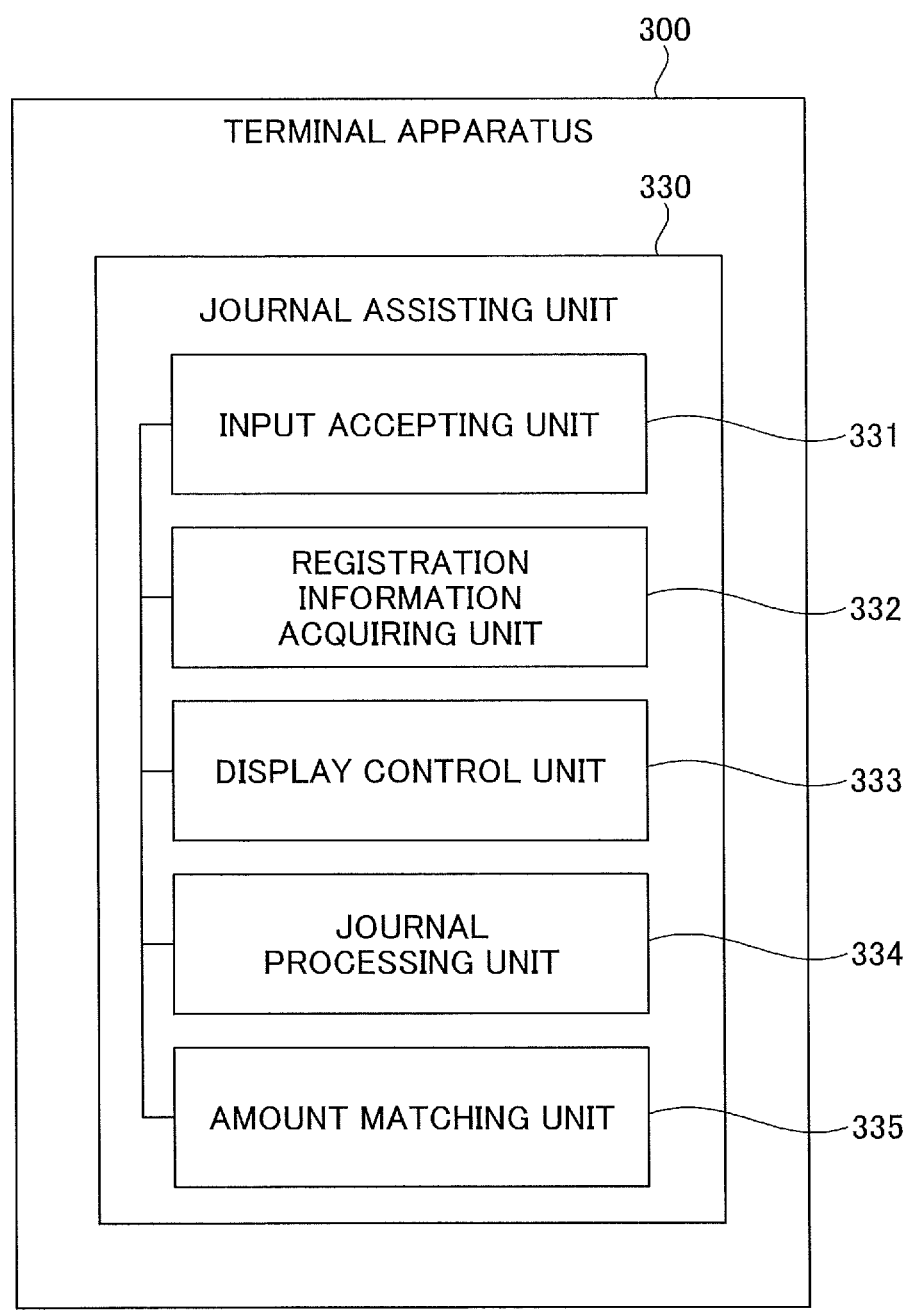
FIG. 9 is a diagram illustrating the functions of a journal assisting unit according to the first embodiment of the present invention.

Next, functions of the journal assisting unit 330 of the terminal apparatus 300 according to the present embodiment will be described in detail with reference to FIG. 9. FIG. 9 is a diagram for explaining the functions of the journal assisting unit according to the first embodiment.

The terminal apparatus 300 according to the present embodiment includes the journal assisting unit 330. The journal assisting unit 330 according to the present embodiment includes an input accepting unit 331, a registration information acquiring unit 332, a display control unit 333, a journal processing unit 334, and an amount matching unit 335.

The input accepting unit 331 accepts various inputs to the terminal apparatus 300. Specifically, the input accepting unit 331 accepts an instruction to display the registration information 255 and a selection of the specification information 244.

The registration information acquiring unit 332 acquires the registration information 255 from the information processing apparatus 200. The display control unit 333 controls the display of the display 318 and the like of the terminal apparatus 300.

When the specification information 244 is selected, the journal processing unit 334 creates a part of the journal information 242 corresponding to the selected specification information 244.

That is, upon accepting an instruction for creating the journal information 242 using the specification information 244, the journal processing unit 334 creates the journal information 242 which partially includes the selected specification information 244.

The amount matching unit 335 checks whether the invoice total amount indicated in the invoice information 241 matches the total amount of the specification information 244 for which the journal information 242 has been generated.

Figure 10:
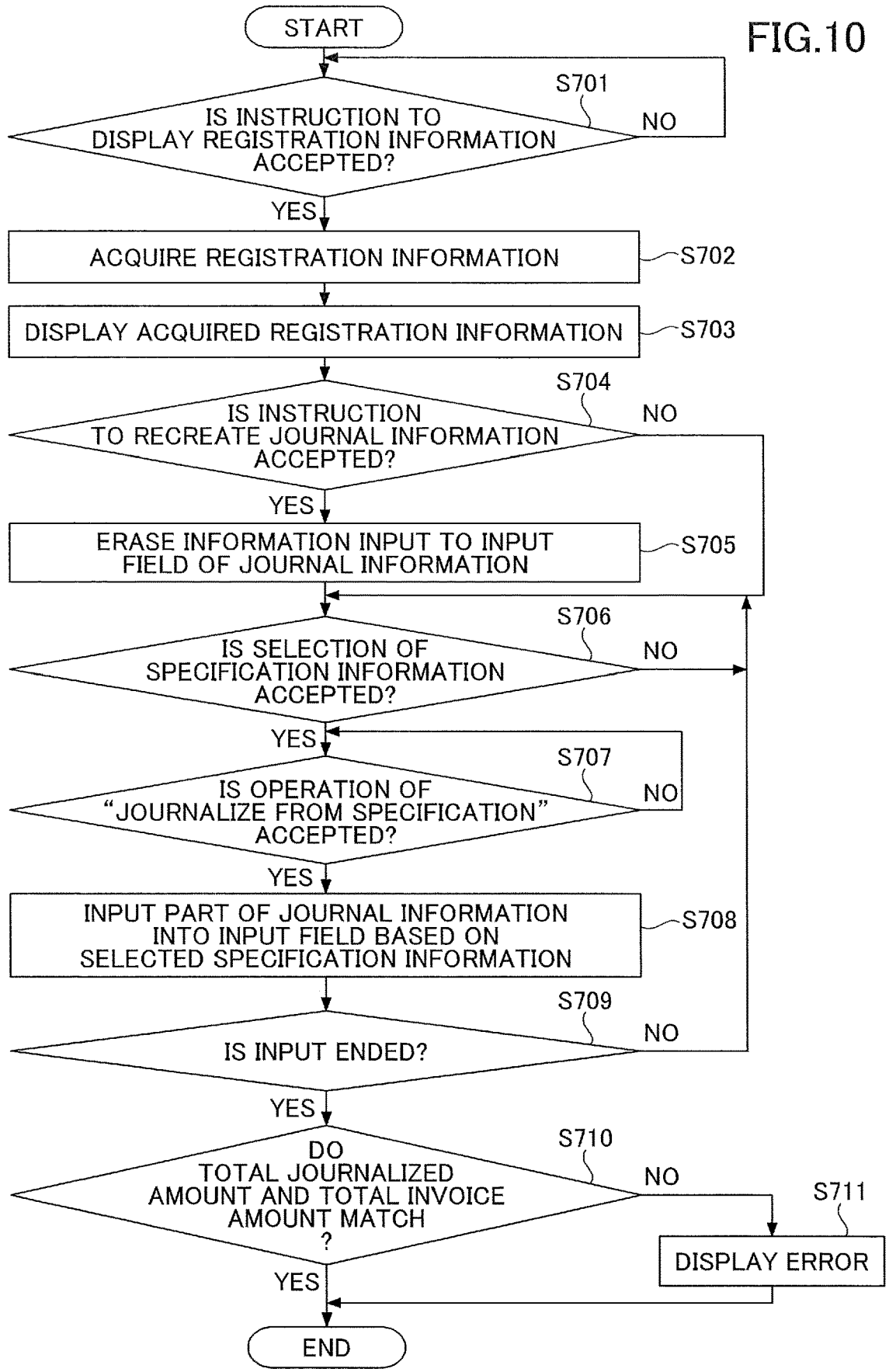
FIG. 10 is a flowchart illustrating an operation of a terminal apparatus according to the first embodiment of the present invention.

Next, the process of the terminal apparatus 300 according to the present embodiment will be described with reference to FIG. 10. FIG. 10 is a flowchart explaining the operation of the terminal apparatus according to the first embodiment.

In the terminal apparatus 300 according to the present embodiment, in step S701, the journal assisting unit 330 determines whether an instruction to display the registration information 255 is accepted by the input accepting unit 331. In step S701, when a display instruction is not accepted, the journal assisting unit 330 waits until a display instruction is accepted.

In step S701, when a display instruction is accepted, the journal assisting unit 330 transmits a request for acquiring the registration information 255 for which the display instruction has been accepted, to the information processing apparatus 200 by the registration information acquiring unit 332, and acquires the registration information 255 from the information processing apparatus 200 (step S702).

Specifically, according to the present embodiment, the information processing apparatus 200 may display a list of pieces of the registration information 255 stored in the registration information storage unit 240, with respect to the terminal apparatus 300. Then, the terminal apparatus 300 may transmit a request for acquiring the registration information 255 selected from the displayed list, to the information processing apparatus 200.

Subsequently, in step S703, the journal assisting unit 330 of the terminal apparatus 300 displays the acquired registration information 255 on the display 318 by the display control unit 333.

Subsequently, in step S704, the journal assisting unit 330 determines whether an instruction for recreating the journal information 242 is accepted by the input accepting unit 331.

Hereinafter, an instruction for recreating the journal information 242 will be described with reference to FIG. 5B. In the input field 25 of the screen 20B illustrated in FIG. 5B, information is input in some input fields. In the present embodiment, the operation of erasing the information input in the input field 25 is expressed as an instruction for recreating the journal information 242.

Specifically, in the present embodiment, when the operation button 24e displayed in the display field 24 is operated, the display control unit 333 of the journal assisting unit 330 erases all information input in the input field 25.

In the present embodiment, a case where information is input in the input field 25 when the registration information 255 is displayed, includes a case where the state indicated by the status information 243 of the registration information 255 is the draft saved state, for example. In this case, in the input field 25, the previously input journal information 242 will be displayed. In the present embodiment, when the operation button 24e is operated in this state, the journal information 242 that has previously been input, is erased from the input field 25.

As described above, in step S704 of FIG. 10, the display control unit 333 determines whether an operation of the operation button 24e for erasing the information input in the input field 25 is accepted.

In step S704, when an instruction for recreation is not accepted, the journal assisting unit 330 proceeds to step S706, which will be described later.

When an instruction for recreation is accepted in step S704, in step S705, the journal assisting unit 330 erases the displayed information in a state where the information is input to the input field 25 of the journal information 242, by the display control unit 333.

Subsequently, in step S706, the journal assisting unit 330 determines whether a selection of the specification information 244 is accepted by the journal processing unit 334. Specifically, the journal processing unit 334 determines whether a check indicating that an article is selected has been input to the selection field 24d, with respect to the list of article names displayed in the display field 24a.

In step S706, when no selection is accepted, the journal processing unit 334 waits until a selection is accepted.

When a selection is accepted in step S706, in step S707, the journal assisting unit 330 determines whether an instruction for creating the journal information 242 is accepted by the input accepting unit 331. In step S707, when no instruction is accepted, the journal assisting unit 330 waits until an instruction is accepted.

When an instruction is accepted in step S707, in step S708, the journal assisting unit 330 creates a part of the journal information 242 based on the selected specification information 244 by the journal processing unit 334, and inputs the part of the journal information 242 in the input field 25 to be displayed (step S708).

Subsequently, in step S709, the journal assisting unit 330 determines whether the input is completed by the input accepting unit 331. Specifically, for example, the input accepting unit 331 determines whether the operation button 26 or the operation button 27 has been operated.

In step S709, when the input is not completed, the journal assisting unit 330 returns to step S706.

When the input is completed in step S709, in step S710, the journal assisting unit 330 determines whether the total journalized amount matches the total invoice amount included in the invoice information 241, by the amount matching unit 335.

Specifically, the amount matching unit 335 determines whether the total amount included in the selected specification information 244 matches the total invoice amount included in the invoice information 241.

In step S710, when the amounts do not match, the journal information 242 displays an error message indicating that the amounts do not match by the display control unit 333 (step S711) and ends the process.

In step S710, when the amounts match, the journal assisting unit 330 ends the process.

Hereinafter, a case in which a plurality of pieces of the journal information 242 are created for the invoice information 241, will be described with reference to FIG. 11. FIG. 11 is a diagram illustrating a display example according to the first embodiment.

A screen 20C illustrated in FIG. 11 is an example of a screen displayed on the display unit of the terminal apparatus 300. The screen 20C indicates a state in which the specification information 244 has been newly selected in the display field 24a of the screen 20B illustrated in FIG. 5B, and a part of the journal information 242 corresponding to the newly selected specification information 244 is input.

In the screen 20C, in the display field 24, pieces of the specification information 244 including the article names "office work desk" and "chair" are selected. In this case, the total amount corresponding to the article names "office work desk" and "chair" is displayed in the display field 24c.

Further, in the display field 24a of the display field 24 of the screen 20C, the specification information 244 that has been selected in the screen 20B and for which the input field of the corresponding journal information 242 is displayed, is displayed in a different display mode from that of the specification information 244 that is not selected.

Specifically, in the screen 20C, the article name "reception table", the selection field of the article name "reception table", and the amount "119,600" of the "reception table", are displayed in a grayed out state. Thus, in the present embodiment, the specification information 244 that has already been selected once and for which a part of the corresponding journal information 242 has been created, is displayed in a manner so as not to be selected again.

When the operation button 24f is operated in the screen 20C, the display control unit 333 displays an input field for inputting the journal information 242 corresponding to the newly selected specification information 244, in the input field 25.

More specifically, when the operation button 24f is operated, the display control unit 333 reflects the journal information 242 corresponding to the selected specification information 244, in the input field 25. That is, first, according to the selection of the selection field 24d, the display control unit 333 dynamically changes the journal information displayed in the input field 25. Then, when the operation button 24f is operated, the display control unit 333 validates the input field 25 in a state in which the journal information 242 corresponding to the selected specification information 244 is input, to newly display the input field 25.

As described above, in the present embodiment, there may be a case where the input field 25 is not displayed in advance, and when the user selects the specification information 244 and operates the operation button 24f, the input field 25 is newly displayed in a state where a part of the journal information corresponding to the selected specification information 244 is input.

Further, in the present embodiment, there may be a case where the input field 25 is displayed in advance, and after the user selects the specification information 244 and the journal information corresponding to the selected specification information 244 is reflected in the input field 25, the user may operate the operation button 24f to validate the input field 25 (newly display the input field 25).

That is, in the present embodiment, an operation on the operation button 24f and an operation on the selection field 24d may be accepted as an instruction to create journal information.

In the example of the screen 20C, input fields 25A and 25B are displayed in the input field 25. The input field 25A is an input field of the journal information 242 corresponding to the specification information 244 including the article name "reception table" which has already been selected.

The input field 25B is an input field newly generated in the screen 20C, and is an input field of the journal information 242 corresponding to the pieces of the specification information 244 including the article names "office work desk" and "chair". The input field 25B is displayed in a state where the amount indicated in the display field 24c is input in an input field 25d of the debit side total amount and an input field 25c of the credit side total amount.

As described above, according to the present embodiment, the input field in which a part of the journal information 242 is automatically input is displayed, simply by performing operations of selecting the specification information 244 from the specification information 244 of the invoice acquired by form recognition and instructing the creation of the journal information 242.

Thus, according to the present embodiment, when inputting the journal information 242, the task of confirming the contents by referring to a form image and the like can be omitted, and the load of inputting the journal information 242 can be reduced.

Second Embodiment

A second embodiment will now be described with reference to the drawings. The second embodiment differs from the first embodiment in that the specification information is displayed by each category. In the description of the second embodiment which follows, differences from the first embodiment are described. Elements having functional configurations similar to those of the first embodiment are denoted by the same reference numerals as those used in the description of the first embodiment, and the descriptions thereof are omitted.

Figure 12:
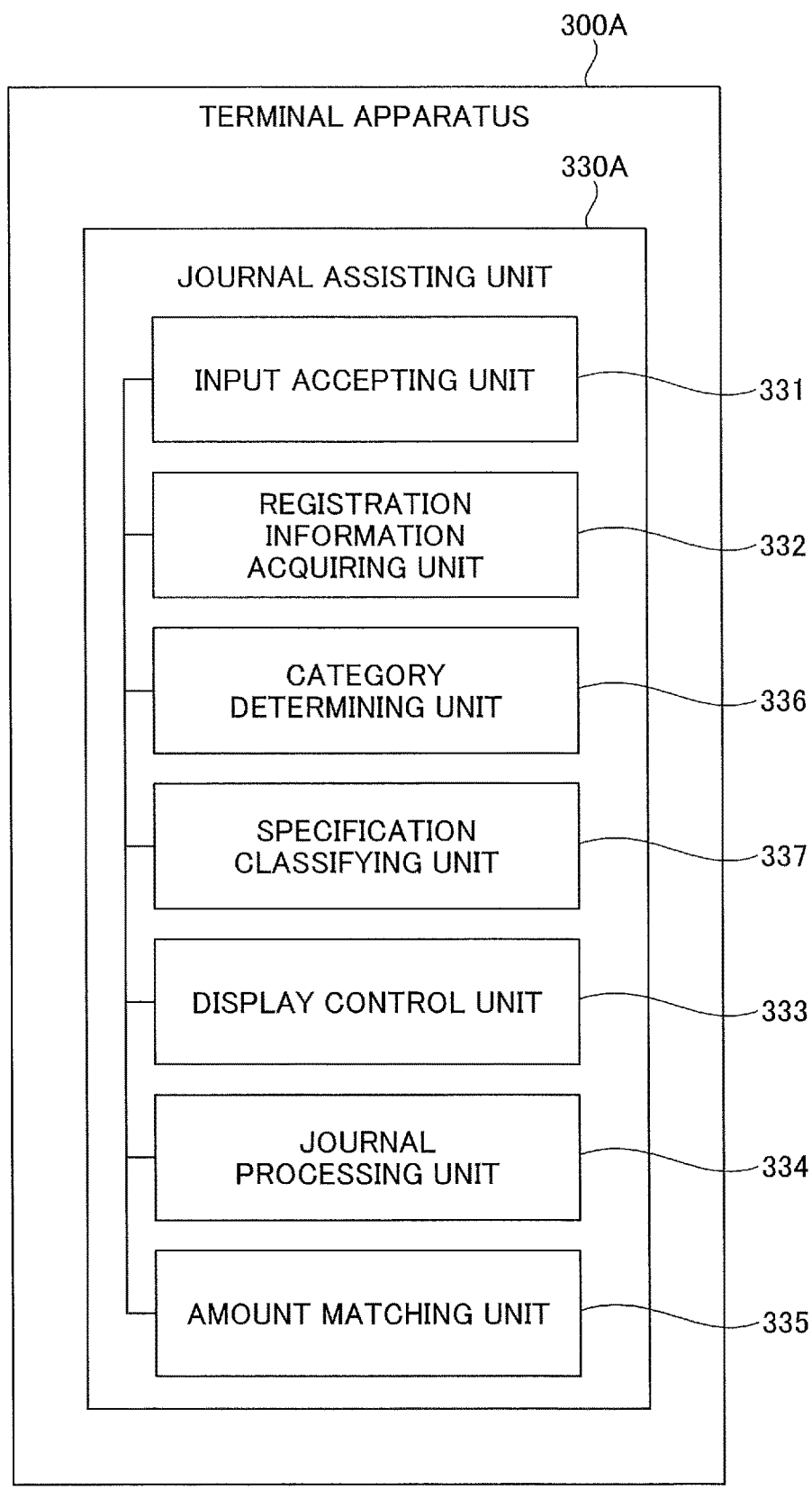
FIG. 12 is a diagram illustrating the functions of a journal assisting unit according to a second embodiment of the present invention.

FIG. 12 is a diagram illustrating functions of a terminal apparatus according to the second embodiment. A terminal apparatus 300A according to the present embodiment includes a journal assisting unit 330A.

The journal assisting unit 330A includes the input accepting unit 331, the registration information acquiring unit 332, the display control unit 333, the journal processing unit 334, the amount matching unit 335, a category determining unit 336, and a specification classifying unit 337.

The category determining unit 336 determines whether an item "category" is included among the items included in the specification information 244.

When it is determined by the category determining unit 336 that an item "category" is included among the items of the specification information 244, the specification classifying unit 337 classifies the specification information 244 according to the value of the item "category".

Figure 13:
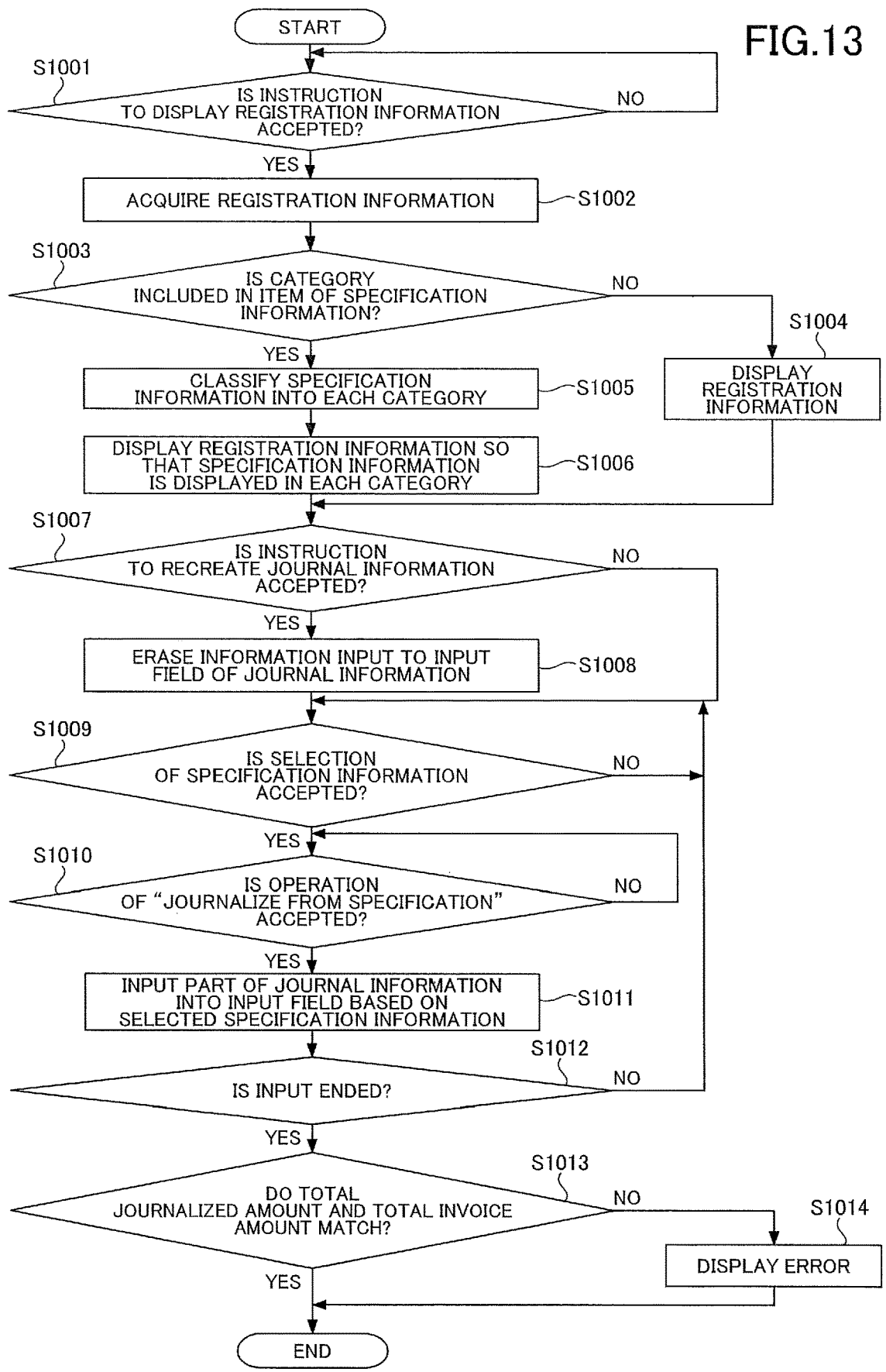
FIG. 13 is a flowchart illustrating an operation of a terminal apparatus according to the second embodiment of the present invention.

Hereinafter, the process of the terminal apparatus 300A according to the present embodiment will be described with reference to FIG. 13. FIG. 13 is a flowchart illustrating an operation of the terminal apparatus according to the second embodiment.

The processes of steps S1001 and S1002 in FIG. 13 are the same as the processes of steps S701 and S702 in FIG. 10, and, therefore, the descriptions thereof will be omitted.

In step S1002, when the registration information is acquired by the registration information acquiring unit 332, in step S1003, the terminal apparatus 300A determines whether an item "category" is included among the items included in the specification information 244 by the category determining unit 336.

In step S1003, when the corresponding item is not included, the journal assisting unit 330A proceeds to step S1004, displays the registration information 255 acquired by the registration information acquiring unit 332 (step S1004), and proceeds to step S1007 to be described later.

In step S1003, when the corresponding item is included among the items of the specification information 244, in step S1005, the journal assisting unit 330A classifies the specification information 244 by the value of the "category" item by the specification classifying unit 337.

Subsequently, in step S1006, the journal assisting unit 330A displays the specification information 244 for each classification by the display control unit 333 and proceeds to step S1007.

The processes from step S1007 to step S1014 of FIG. 13 are the same as the processes from step S704 to step S711 of FIG. 10, and, therefore, the descriptions thereof will be omitted.

Next, a display example according to the present embodiment will be described with reference to FIG. 14. FIG. 14 is a diagram illustrating a display example according to the second embodiment.

In a screen 20D illustrated in FIG. 14, an item "category" is included in a table 21b included in the form image displayed in the display field 21. Accordingly, in the example of FIG. 14, the specification information 244 acquired from the form image data includes the item "category".

In the example of FIG. 14, the value of the item "category" indicates whether the consumption tax rate is 8% or 10%. More specifically, in the example of FIG. 14, when the value of the item "category" is empty, it means that the consumption tax rate of the article indicated by the article name included in the corresponding specification information 244 is 10%. In the example of FIG. 14, when the value of the item "category" is "★", it means that the consumption tax rate of the article indicated by the article name included in the corresponding specification information 244 is 8%.

Accordingly, in the journal assisting unit 330A, the specification classifying unit 337 classifies a plurality of pieces of the specification information 244 included in the invoice information 241 into the specification information 244 for which the consumption tax rate is 10% and the specification information 244 for which the consumption tax rate is 8%, and the display control unit 333 displays the pieces of the specification information 244 in a manner as to be classified into the respective consumption tax rates.

The display field 24 of the screen 20D includes a display field 24A and a display field 24B. The display field 24A displays a list of the specification information 244 for which the consumption tax rate is 10% and the display field 24B displays a list of the specification information 244 for which the consumption tax rate is 8%.

That is, in the display field 24A, a list of the specification information 244 for which the value of the item "category" is empty, is displayed; and in the display field 24B, a list of the specification information 244 for which the value of the "category" is "★", is displayed.

Further, in the display fields 24A and 24B, pieces of information 24g and 24h indicating the respective categories, are displayed.

Also, in a display field 24ca in the display field 24A, the total value of the amounts included in the respective pieces of the specification information 244 displayed in the display field 24A, is displayed.

Further, in the present embodiment, when the specification information 244 is selected and an operation button 24fa is operated in the display field 24A, the journal processing unit 334 generates a part of the journal information 242 in the input field 25 using the specification information 244 selected in the display field 24A. Then, the display control unit 333 displays, in the input field 25, an input field of the journal information 242 corresponding to the specification information 244 selected in the display field 24A.

Also, in a display field 24cb in the display field 24B, the total value of the amounts included in the respective pieces of the specification information 244 displayed in the display field 24B, is displayed.

Further, according to the present embodiment, when the specification information 244 is selected and an operation button 24fb is operated in the display field 24B, the journal processing unit 334 generates a part of the journal information 242 in the input field 25 using the specification information 244 selected in the display field 24B. Then, the display control unit 333 displays, in the input field 25, an input field of the journal information 242 corresponding to the specification information 244 selected in the display field 24B.

Note that in the present embodiment, the specification information 244 is classified based on the value of the item "category" included in the specification information 244, but the present embodiment is not limited thereto.

The specification information 244 may be classified by various methods. Specifically, the item to be referred to when classifying the specification information 244 may be other than the item "category", and for example, the specification information 244 may be classified by referring to a value of an item set in advance.

As described above, in the present embodiment, the specification information 244 can be displayed in a classified manner. Further, in the present embodiment, among the groups of the classified pieces of the specification information 244, for each piece of the selected specification information 244, an input field for inputting the journal information 242 can be displayed in a state where a part of the journal information 242 is already input.

Third Embodiment

A third embodiment will now be described with reference to the drawings. The third embodiment differs from the first embodiment in that a function of the terminal apparatus is provided in the information processing apparatus. In the description of the third embodiment which follows, differences from the first embodiment are described. Elements having functional configurations similar to those of the first embodiment are denoted by the same reference numerals as those used in the description of the first embodiment, and the descriptions thereof are omitted.

Figure 15:
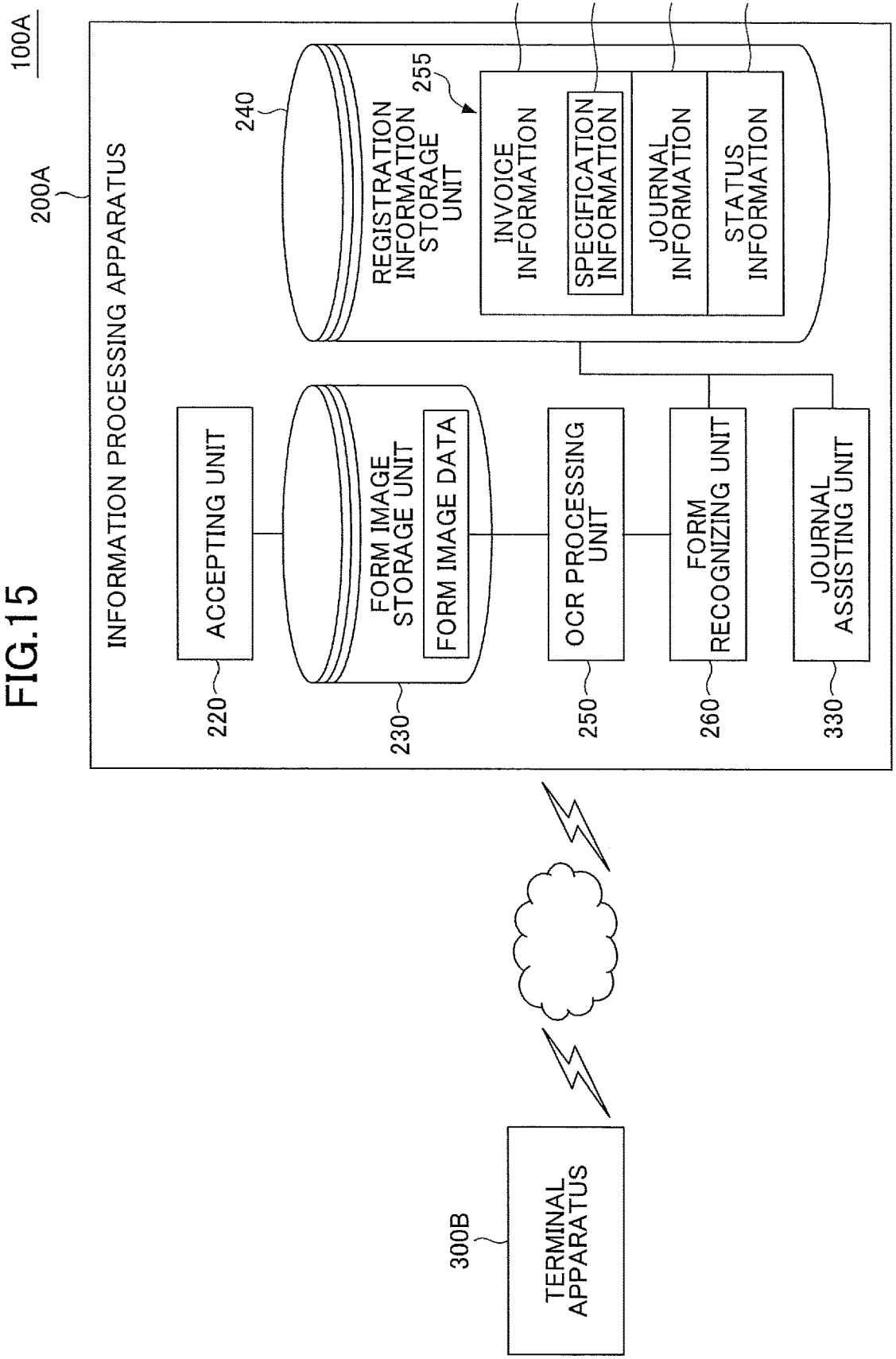
FIG. 15 is a diagram illustrating functions of each apparatus of an information processing system according to a third embodiment of the present invention.

FIG. 15 is a diagram illustrating the functions of each apparatus of an information processing system according to the third embodiment. An information processing system 100A according to the present embodiment includes an information processing apparatus 200A and a terminal apparatus 300B.

The information processing apparatus 200A according to the present embodiment includes the accepting unit 220, the form image storage unit 230, the registration information storage unit 240, the OCR processing unit 250, the form recognizing unit 260, and in addition, the journal assisting unit 330.

When an instruction to display the registration information 255 is accepted from the terminal apparatus 300B, the information processing apparatus 200A according to the present embodiment causes the terminal apparatus 300B to display, for example, the screen 20A (see FIG. 5A). Then, when the information processing apparatus 200A accepts a selection of the specification information 244 from the terminal apparatus 300B, the information processing apparatus 200A causes the journal assisting unit 330 to create a part of the journal information 242 using the selected specification information 244 and causes the terminal apparatus 300B to display the input field 25 for the journal information 242 in a state where a part of the journal information 242 is input.

As described above, in the present embodiment, the journal assisting unit 330 is provided in the information processing apparatus 200A, and, therefore, it is not necessary to provide the journal assisting unit 330 in the terminal apparatus 300B, so that a general-purpose terminal apparatus can be used.

According to the present embodiment, the information processing apparatus 200A may distribute a program that implements the journal assisting unit 330 to the terminal apparatus 300B, so that the journal assisting unit 330 is provided in the terminal apparatus 300B.

Further, in the example of FIG. 15, the screen 20A is displayed on the terminal apparatus 300B, but the present embodiment is not limited thereto. The information processing apparatus 200A may have a browser, and upon accepting an operation to the information processing apparatus 200A, the information processing apparatus 200A may cause the browser of the information processing apparatus 200A to display the screen 20A, and may accept a selection of the specification information 244.

The functions of each of the embodiments described above may be implemented by one or more processing circuits. As used herein, a "processing circuit" includes a processor programmed to execute each function by software such as a processor implemented in an electronic circuit; or devices such as an Application Specific Integrated Circuit (ASIC) a digital signal processor (DSP), a field programmable gate array (FPGA), and a conventional circuit module, designed to execute each function as described above.

Also, the apparatus group described in the embodiments described above are merely indicative of one of a plurality of computing environments for carrying out the embodiments disclosed herein. In some embodiments, the information processing apparatus 200 includes a plurality of computing devices, such as server clusters. The plurality of computing devices are configured to communicate with each other via any type of communication link, including networks, a shared memory, and the like, and perform the processes disclosed herein.

Similarly, the information processing apparatus 200 may include, a plurality of computing devices configured to communicate with each other. Further, the information processing apparatus 200 may be configured to share the disclosed processing steps, for example, those of FIGS. 10 and 13, in various combinations. For example, a process executed by a predetermined unit may be executed by the information processing apparatus 200. Similarly, a function of a predetermined unit may be executed by the information processing apparatus 200. Each element of the information processing apparatus 200 may be grouped into a single server apparatus or divided into a plurality of apparatuses.

The registration information 255 in the present specification may be generated by the learning effect of machine learning. Here, machine learning is a technique for causing a computer to acquire a learning ability like a person, in which a computer autonomously generates an algorithm necessary for determining the data identification and the like from previously acquired learning data, and applies the algorithm to new data to make predictions. The learning method for machine learning may be supervised learning, unsupervised learning, semi-supervised learning, reinforcement learning, or deep learning, or a combination of these learning methods, and the learning method for machine learning is not limited.

According to one embodiment of the present invention, the load of inputting journal information is reduced.

The information processing system and the method are not limited to the specific embodiments described in the detailed description, and variations and modifications may be made without departing from the spirit and scope of the present invention.

What is claimed is:

1. An information processing system comprising:
circuitry configured to
perform form recognition on form image data to extract text data indicative of specification information items,
display, on a display, a list of specification information items based on the extracted text data,
accept a selection of a specification information item from the list of specification information items displayed on the display; and
display, on the display, at least two input fields in which journal information based on the selected specification information item is input, the two input fields being an input field for a debit journal entry and an input field for a credit journal entry.

2. The information processing system according to claim 1, wherein the circuitry is configured to display the input fields of the journal information in a state in which the journal information created by using the selected specification information item is input, upon accepting an instruction to create the journal information corresponding to the selected specification information item.

3. The information processing system according to claim 2, wherein a part of the journal information is information included in the selected specification information item.

4. The information processing system according to claim 1, Wherein the circuitry is configured to display, on the display, the input fields of the journal information corresponding to the selected specification information item, for each piece of the selected specification information item.

5. The information processing system according to claim 1, wherein the circuitry is configured to display the selected specification information item in a display mode that is different from a display mode of the specification information item that is not selected, in the list.

6. The information processing system according to claim 1, wherein the circuitry is configured to classify the specification information item according to a value of a predetermined item upon determining that the specification information item includes the predetermined item, wherein
the circuitry is configured to display, on the display, the list of specification information items by each classification into which the specification information item is classified.

7. The information processing system according to claim 6, wherein the circuitry is configured to display information indicated by the value of the predetermined item, together with the list of specification information items, for each classification into which the specification information item is classified.

8. The information processing system according to claim 1, wherein the circuitry is configured to erase the journal information displayed in the input fields upon accepting an instruction to recreate the journal information.

9. An information processing method executed by an information processing system, the information processing method comprising:
performing form recognition on form image data to extract text data indicative of specification information items,
displaying, on a display, a list of specification information items based on the extracted text data,
accepting a selection of a specification information item from the list of specification information items displayed on the display; and
displaying, on the display, at least two input fields in which journal information based on the selected specification information item is input, the two input fields being an input field for a debit journal entry and an input field for a credit journal entry.

10. The information processing method according to claim 9, wherein the displaying includes displaying the input fields of the journal information in a state in which the journal information created by using the selected specification information item is input, upon accepting an instruction to create the journal information corresponding to the selected specification information item.

11. The information processing method according to claim 10, wherein a part of the journal information is information included in the selected specification information item.

12. The information processing method according to claim 9, wherein the displaying includes displaying, on the display, the input fields of the journal information corresponding to the selected specification information item, for each piece of the selected specification information item.

13. The information processing method according to claim 9, wherein the displaying includes displaying the selected specification information item in a display mode that is different from a display mode of the specification information item that is not selected, in the list.

14. The information processing method according to claim 9, further comprising:
classifying the specification information item according to a value of a predetermined item upon determining that the specification information item includes the predetermined item, wherein
the displaying includes displaying, on the display, the list of specification information items by each classification into Which the specification information item is classified.

15. The information processing method according to claim 14, wherein the displaying includes displaying information indicated by the value of the predetermined item, together with the list of specification items, for each classification into which the specification information item is classified.

16. The information processing method according to claim 9, wherein the displayer erases the journal information displayed in the input fields upon accepting an instruction to recreate the journal information.

17. An information processing apparatus comprising:
circuitry configured to
perform form recognition on form image data to extract text data indicative of specification information items,
display, on a display, a list of specification information items based on the extracted text data,
accept a selection of a specification information item from the list of specification information items displayed on the display; and
display, on the display, at least two input fields in which journal information based on the selected specification information item is input, the two input fields being an input field for a debit journal entry and an input field for a credit journal entry.

* * * * *